(12) United States Patent
Mehta et al.

(10) Patent No.: US 8,074,780 B2
(45) Date of Patent: Dec. 13, 2011

(54) CLUTCH ADJUSTER

(75) Inventors: Vijay Krishan Mehta, New Delhi (IN); Sanju Prasad, Faridabad (IN); Ram Phal Singh Dalal, Faridabad (IN)

(73) Assignee: Clutch Auto Limited, New Delhi (IN)

( * ) Notice: Subject to any disclaimer, the term of this patent is extended or adjusted under 35 U.S.C. 154(b) by 284 days.

(21) Appl. No.: 12/344,365

(22) Filed: Dec. 26, 2008

(65) Prior Publication Data
US 2009/0166145 A1   Jul. 2, 2009

(30) Foreign Application Priority Data
Dec. 26, 2007   (IN) .......................... 2714/DEL/2007

(51) Int. Cl.
*F16D 13/75* (2006.01)

(52) U.S. Cl. ........... 192/111.15; 192/70.251; 192/111.7; 192/114 R

(58) Field of Classification Search ............. 192/70.251, 192/111.15, 111.6, 111.7; 411/120
See application file for complete search history.

(56) References Cited

U.S. PATENT DOCUMENTS

| | | | |
|---|---|---|---|
| 337,653 A * | 3/1886 | Beisel | 411/120 |
| 3,389,735 A * | 6/1968 | Katz | 411/120 |
| 4,938,644 A * | 7/1990 | Runels | 411/132 |
| 4,953,680 A | 9/1990 | Flotow et al. | |
| 5,320,205 A | 6/1994 | Kummer et al. | |
| 5,526,913 A * | 6/1996 | Tarlton et al. | 192/70.251 |
| 6,974,013 B1 | 12/2005 | Catrina | |

* cited by examiner

*Primary Examiner* — Richard M. Lorence
(74) *Attorney, Agent, or Firm* — Workman Nydegger

(57) ABSTRACT

A clutch adjuster to be used in a manually adjustable clutch is provided for compensating the effect of clutch wear. The clutch adjuster has a substantially flat top plate adapted to be secured to the clutch housing, a fastener, a rotary gear, a locking member and a resilient member. The fastener has a head and a shaft and being captured by an aperture in the substantially flat top plate. The rotary gear is connected to the shaft of the fastener. The locking member is configured below the substantially flat top plate and has at least one protrusion passing upward through the aperture of the substantially flat top plate and projecting therefrom. The protrusion is configured to be in a selective locking engagement with the head of the fastener. The resilient member is configured between the locking member and the rotary gear for resiliently biasing the locking member towards the substantially flat top plate.

7 Claims, 4 Drawing Sheets

CLUTCH ADJUSTER

FIELD OF THE INVENTION

The present invention relates to automobile clutches in general and more particularly relates to a mechanism for manually adjusting pull type clutches.

BACKGROUND OF THE INVENTION

Clutches are an important component of automobiles such as trucks, buses, cars etc. Typically clutches are the devices adapted to connect a driven means and a rotational power source. The clutch assembly is generally fitted on a flywheel, which is mounted on, and rotatable with, a driving shaft such as the crankshaft of the internal combustion engine. One or more pressure plates are fixed to the clutch assembly for rotation with it, while being displaceable axially under the biasing action of axially acting clutch engaging means controlled by declutching means. One or more friction disc, carrying at least one friction liner at its outer periphery, and being fixed to and rotatable with a driven shaft such as the input shaft of the gearbox, is interposed between the pressure plate and the flywheel so as to be gripped between them when the clutch is in its engaged condition. The clutch engaging means control the axial displacement of the pressure plate when they are actuated by a clutch release bearing through the declutching means.

In the course of the working of such a clutch, the friction liner or liners and the components with which they cooperate, namely the pressure plate and flywheel become worn out. The worn out condition of the component causes variation in the position of the pressure plate, the axially acting clutch engaging means and the clutch release bearing. Such a change in position affects the working condition of the declutching means. Also such a change in the position will alter the effect of biasing members placed between the clutch cover and pressure plate. Hence it is required to bring back or restore this change or at least restore the position of axially acting clutch engaging means and the clutch release bearing.

Generally clutches have the provision of adjustment for the position of the release bearing to pay off for the wear. Typically a wear take-up assembly is often used to do the manual adjustment. The wear take-up assembly has an adjusting ring and a clutch adjuster. The adjusting ring is disposed circumferentially and has teeth along its inner circumference. The teeth being adapted to cooperate with the clutch adjuster. Manual rotation of the clutch adjuster causes rotation of the adjusting ring relative to clutch cover thereby causing a change in the position of release bearing.

One such arrangement is disclosed in U.S. Pat. No. 4,953,680 wherein rotating gear typically includes a central bolt terminating in a hex-head that is engaged by a socket wrench for rotating the gear. The clutch adjuster is locked in position by a formed lock strap that prevents rotation of the head associated with the gear. The formed lock strap also works as a biasing member. The locking and unlocking of the head of the central bolt is done by pressing down the formed lock strap. Further a separate biasing member in the form of a coil spring may also be incorporated in between the head of the central bolt and above the central depressed area of the top plate. The clutch adjuster is designed to unlock by pressing the center bolt down at a reasonable force. Specifically, axial movement of the center bolt is necessary to perform the locking and unlocking of the clutch adjuster. Due to the dirty environment and the size of the ring to be rotated, the teeth of the adjusting ring and clutch adjuster can become frozen or locked. This increases substantially the force needed to axially move the center bolt to unlock the adjuster, and may make it practically impossible. Further the locking is "blind," i.e., the locking surfaces are obscured from view. This leads to uncertainty as to whether locking has, in fact, occurred. If the clutch adjuster is not, in fact, locked into position, upon the first engagement of the clutch, the central bolt will rotate, and thereby clutch will go out of adjustment and thus the clutch will become inoperable.

The clutch adjuster such as disclosed in U.S. Pat. No. 6,974,013 has a specially designed top plate or bracket having a central depressed area between two L-shaped arms. The bracket is adapted to be secured to the clutch cover. The depressed portion of the bracket has an aperture for adopting a bolt having a head and a shaft. The shaft of the bolt has a rotary gear having teeth adapted to mesh with the teeth of an adjusting ring. The bracket further accommodates a rectangular locking member for selectively locking the head of the bolt and to prevent rotation of the bolt. The locking member is placed above the central depressed area of top plate or bracket and head of the bolt. Further a disc spring or a spring washer is accommodated below the locking member and above the central depressed area of the top plate or bracket. The spring biases the locking member towards the head of the bolt. The locking member prevents the rotation of the bolt, when in locking engagement with the head of the bolt so that the arms of the top plate or bracket substantially prevent rotation of the locking member. However the specially designed top plate or bracket having a centrally depressed area increases cost substantially and results in complex and heavy adjuster. Further the bracket having bends at four places posses a greater chance of failure because of increased stress at the curvatures. The locking member and the spring being above the top plate or bracket of the adjuster are susceptible to dirt and often get jammed over period of time.

Another clutch adjuster is disclosed in U.S. Pat. No. 5,320,205. The disclosed clutch adjuster has a specially designed bent top plate and a central bolt having a special hexagonal shape formed on its shaft. The central depressed area of the top plate has a corresponding female hexagonal groove which acts as a locking device for the central bolt. A biasing member is placed between the central depressed area of the top plate and the head of the central bolt. For adjusting clutch, the central bolt head is pressed down by an external force until the hexagonal shaped part comes out of engagement with the central depressed area of the top plate. A rotary gear also moves axially with the central bolt for adjusting the clutch. With the dirt and dust in the clutch during working, teeth of the rotary gear and the adjusting ring may gets jammed and may not permit their axial movement. Also the biasing member being above the top plate may get jammed due to dirt and dust.

The present invention is directed to overcoming one or more of the problems as set forth above.

SUMMARY OF THE INVENTION

It is a principal object of the present invention to provide a mechanism for adjusting clutches.

It is another object of the present invention to provide a clutch adjuster for a clutch having a housing and a toothed adjusting ring. The clutch adjuster includes a substantially flat top plate, a fastener, a rotary gear, a locking member and a resilient member. The substantially flat top plate is adapted to be secured to the clutch housing. The fastener has a head and a shaft and being captured by an aperture in the substantially flat top plate such that the head of the fastener being arranged above a plane defined by the substantially flat top plate. The rotary gear has teeth adapted to mesh with the teeth of the adjusting ring. The rotary gear is connected to the shaft of the fastener below the plane defined by the substantially flat top plate. The locking member is configured below the substantially flat top plate and has at least one protrusion passing upward through the aperture of the substantially flat top plate and projecting therefrom. The protrusion being configured for selective locking engagement with the head of the fastener. The resilient member is configured between the locking member and the rotary gear for resiliently biasing the locking member towards the substantially flat top plate.

It is another object of the present invention to provide a mechanism for adjusting clutches having a straight top plate.

It is another object of the present invention to provide a mechanism for manually adjusting pull type clutch that is easy to manufacture.

In accordance with another object of the present invention wherein, said mechanism is retrofittable on any clutch within this family of manual adjusting clutches.

Further in accordance with another object of the present invention, there is provided a mechanism for adjusting pull type clutch wherein, said adjusting mechanism is simple in design and cost saving.

It is yet another object of the present invention to provide a mechanism for adjusting pull type clutch wherein, said adjusting mechanism is easy to use, quick and fool-proof.

Other details and advantages of the invention will become apparent by reference to the following description and illustrative drawings of certain present embodiments thereof.

DETAILED DESCRIPTION OF THE PREFERRED EMBODIMENTS

Figure 1:
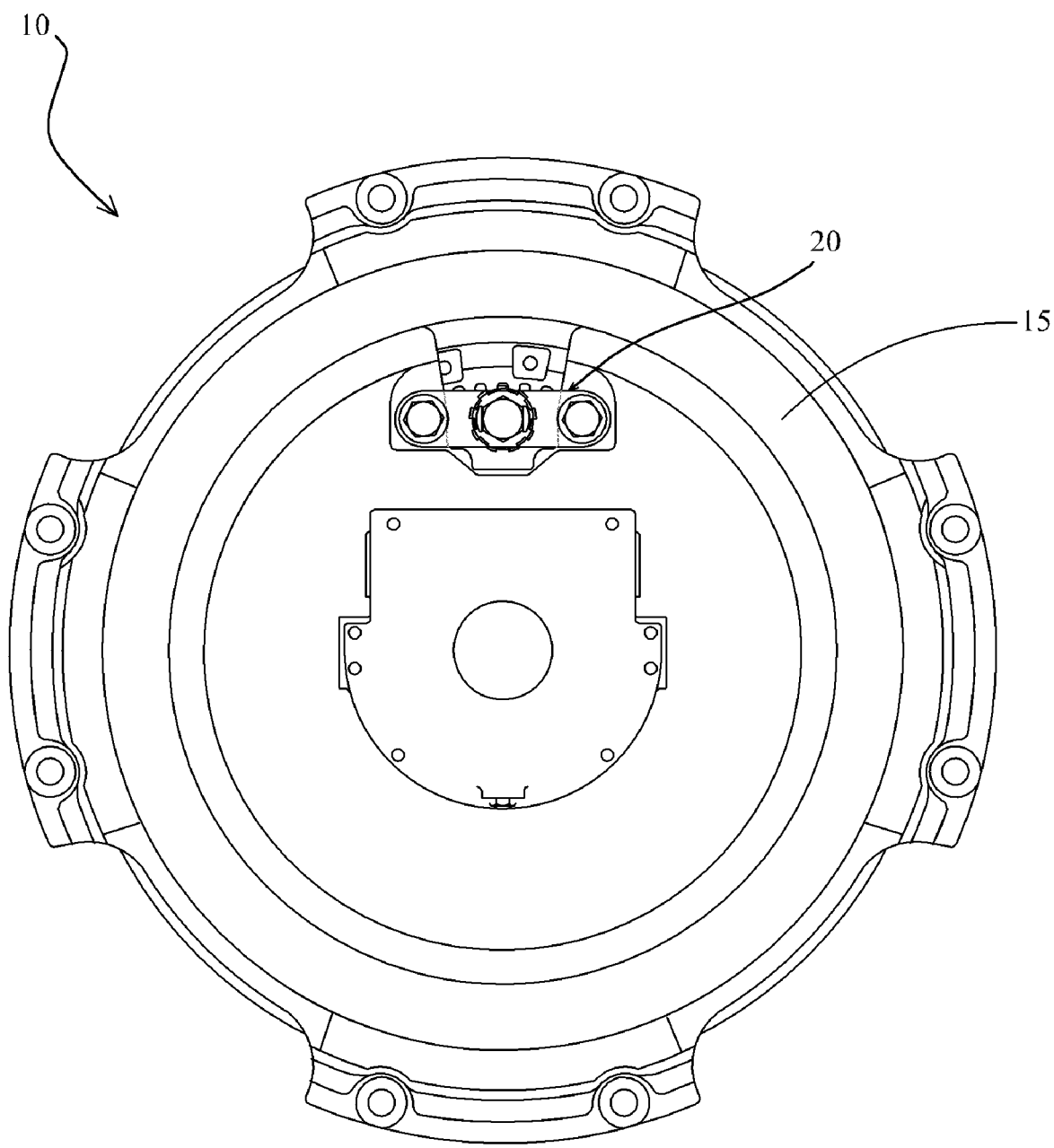
FIG. 1 illustrates a schematic view of a clutch that incorporates clutch adjuster as per the present invention.
Figure 2:
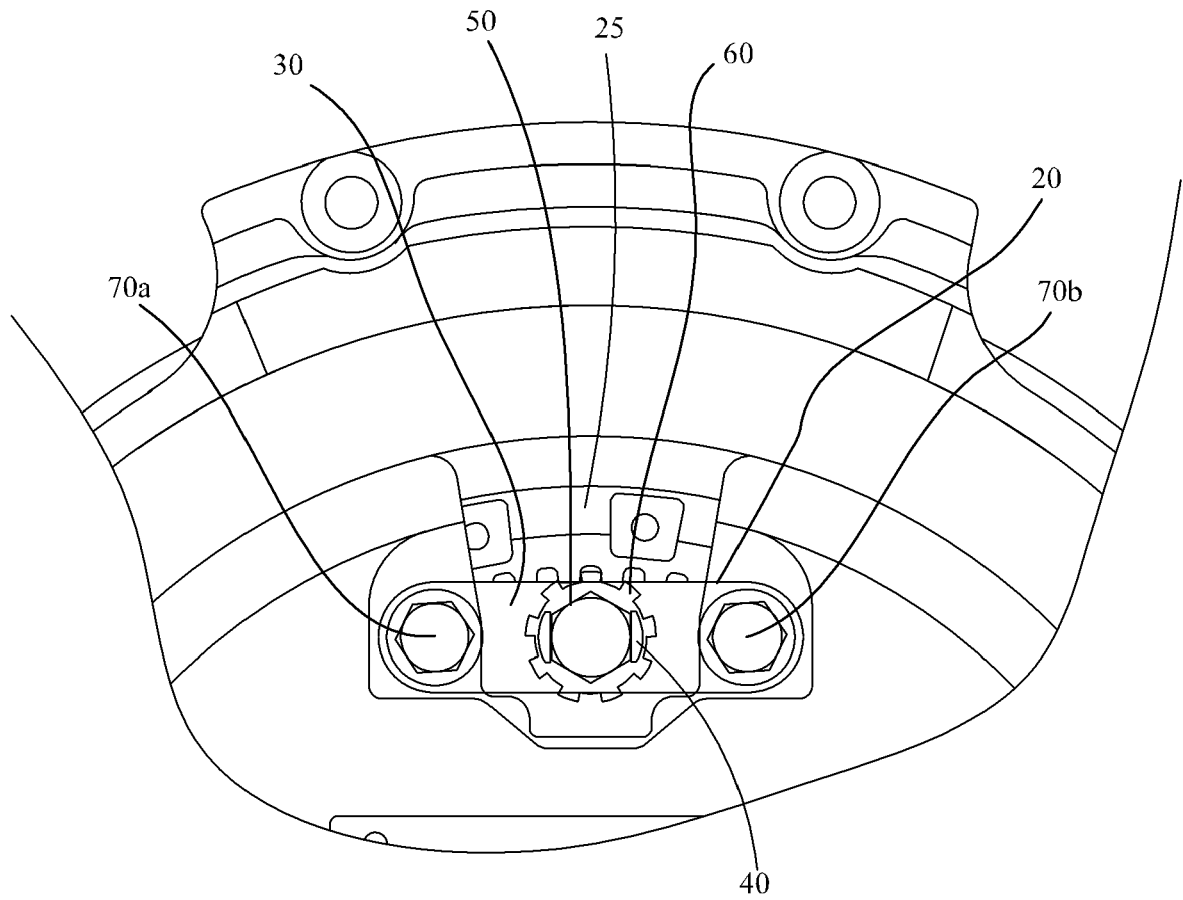
FIG. 2 illustrates an enlarged view of clutch adjuster incorporated in a clutch as shown in FIG. 1

FIG. 1 and FIG. 2 illustrates a schematic view of a clutch 10, which incorporates a clutch adjuster 20 according to an embodiment of the present invention.

As shown in FIG. 1 and FIG. 2 the clutch adjuster 20 is secured to a clutch cover or clutch housing 15. The clutch adjuster 20 includes a substantially flat top plate 30 and a locking member 40 that captures a head 65 of a fastener 50. The fastener 50 carries a rotary gear 60. The substantially flat top plate 30 of the clutch adjuster 20 is secured to the clutch housing 15 by fasteners 70a, 70b such as but not limited to bolts. The rotary gear 60 is configured to mate with and to rotate the adjusting ring 25.

Figure 3:
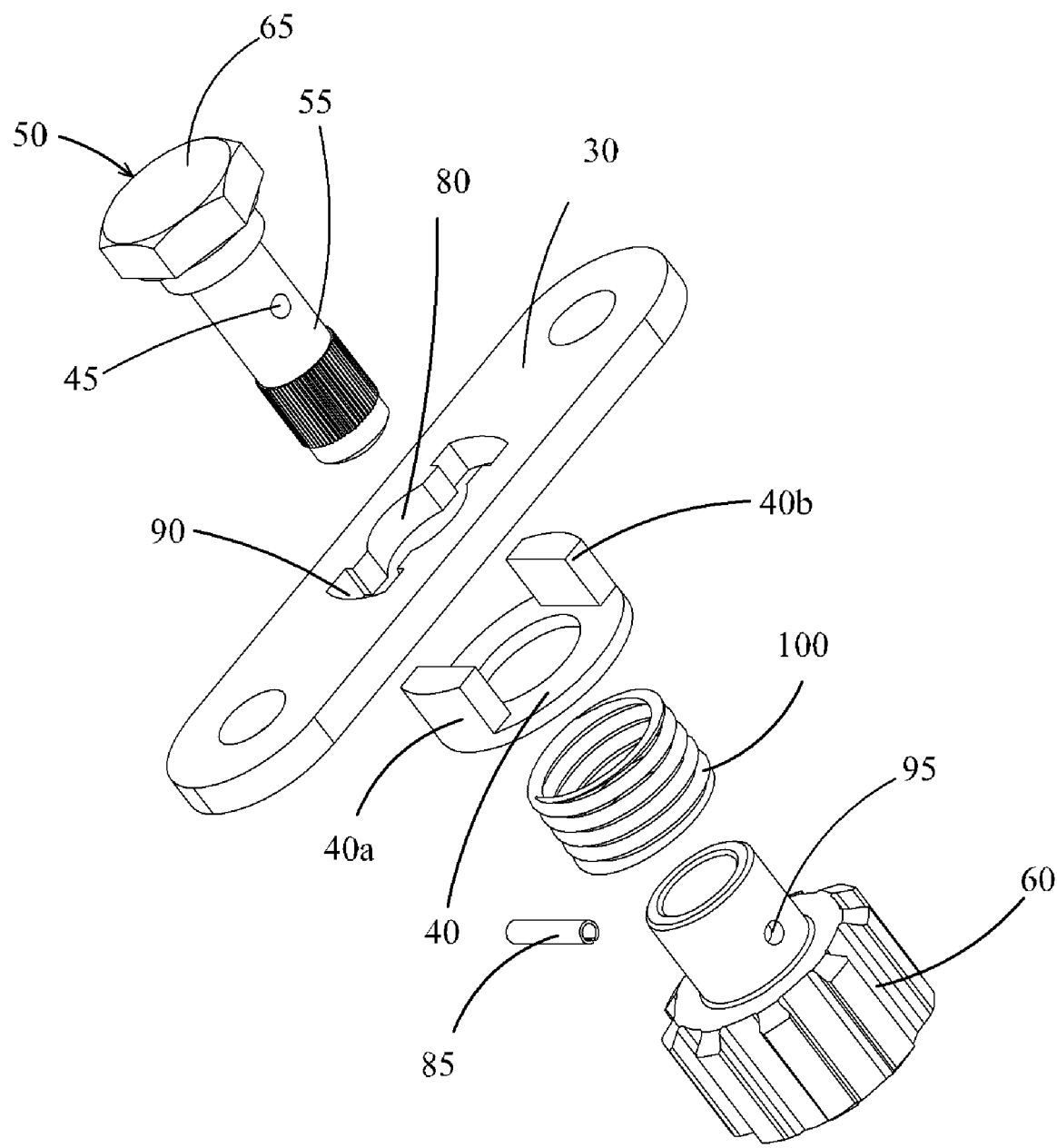
FIG. 3 illustrates an exploded view of the clutch adjuster according to an embodiment of the present invention.

FIG. 3 illustrates an exploded view of the clutch adjuster according to an embodiment of the present invention. The clutch adjuster 20 includes a substantially flat top plate 30, a fastener 50 having a head 65 and a shaft 55, a locking member 40 having at least one protrusion, a resilient member 100 and a rotary gear 60. The substantially flat top plate 30 has an aperture 80 for holding the fastener 50. The fastener 50 is so configured such that the head 65 is at one side of the aperture 80 and the shaft 55 passes through the aperture and the resilient member 100. The resilient member 100 such as, but not limited to coil spring, disc spring, conical coil spring etc., is configured for pliantly holding the locking member 40 in position. The resilient member 100 is arranged between the locking member 40 and the rotary gear 60. The aperture 80 further has one or more windows 90 for adopting one or more protrusion 40a, 40b of the locking member 40. In one embodiment the locking member 40 may have atl of at least two protrusions 40a, 40b. The substantially flat top plate 30 further has one or more holes 75a, 75b for adopting fasteners, such as but not limited to bolts 70a, 70b, for securing the clutch adjuster 30 to the clutch housing 20.

In one embodiment the shaft 55 may have knurling for coupling with the rotary gear 60. In another embodiment a locking arrangement may be provided for securely locking the shaft 55 and the rotary gear 60 to avert any relative motion between the shaft 55 and the rotary gear 60. In one embodiment the locking arrangement may include an opening 45 in the shaft 55, an opening 95 in the rotary gear 60 and a lock pin 85. The lock pin 85 can be securely accommodated in the opening 95 in the rotary gear 60 and passes through the opening 45 in the shaft 55 thereby evading the possibility of any relative motion between the fastener 50 and the rotary gear 60.

Figure 4:
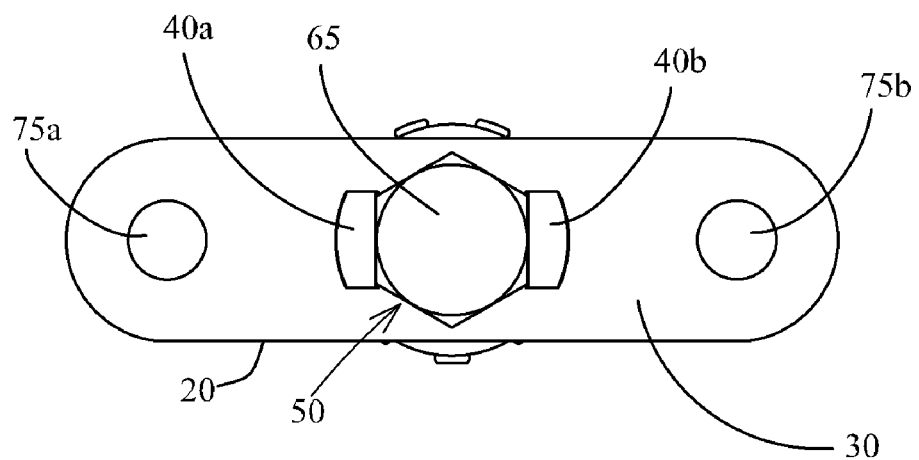
FIG. 4 illustrates plan view of the clutch adjuster according to an embodiment of the present invention.
Figure 5:
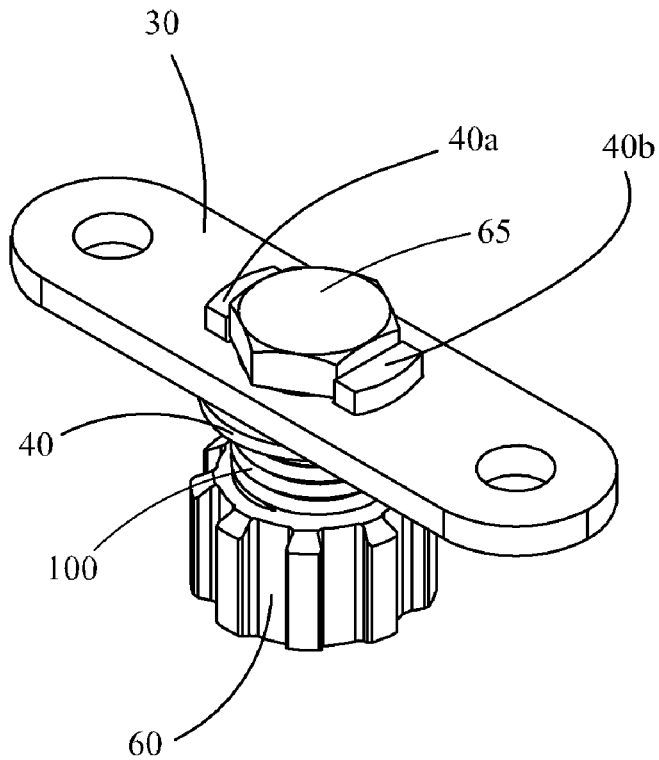
FIG. 5 illustrates an isometric view of the clutch adjuster according to an embodiment of the present invention.

FIG. 4 illustrates plan view and FIG. 5 illustrates an isometric view of the assembly of the clutch adjuster 20 according to an embodiment of the present invention. The clutch adjuster 20 has a substantially flat top plate 30, a central fastener 50 having a head 65 and a shaft 55 (as shown in FIG. 3), a rotary gear 60, a resilient member 100 and a locking member 40. The locking member 40 is placed below the substantially flat top plate 30 and is pliantly held in its position by the resilient member 100. The resilient member 100 is arranged between the locking member 40 and the rotary gear 60. The shaft 55 of the fastener 50 passes through an aperture 80 (as shown in FIG. 3) of the substantially flat top plate 30, through the locking member 40 and through the resilient member 100 and coupled to the rotary gear 60 at one end. The locking member 40 has two protrusions 40a, 40b passing upward through the aperture 80 of the substantially flat top plate 30 and projecting therefrom. The protrusions 40a, 40b are so arranged to capture the head 65 of the fastener 50 and arrests its rotations relative to substantially flat top plate 30. The locking member 40 can move axially along the shaft 55 of the fastener 50 under an external force, against the resilient member 100 and can regain its position once the external force is removed. To rotate the fastener 50, the protrusions 40a, 40b can be pressed down so that the locking member 40 can move axially against the resilient member 100. For adjusting clutch assembly, the fastener 50 may be rotated that in turn rotates the rotary gear 60 causing rotation of an adjusting ring 25 (as shown in FIG. 2) thereby adjusting the height of release bearing. For rotating the fastener 50, the protrusions 40a, 40b of the locking member 40 must be pressed down by an external force against the force of the resilient member 100. Any suitable type of spanner can be used for pressing down the protrusions 40a, 40b of the locking member 40. The head 65 of the bolt 50 will be free to rotate with gear 60 once protrusions 40a, 40b of the locking member 40 are pressed down. Once the height of the release bearing is suitably adjusted the external force from the protrusions 40a, 40b can be removed. As the external force is removed the locking member 40 regain its position under the force of the resilient member 100 and the protrusions 40a, 40b arrests the rotation of the fastener 50.

While certain present preferred embodiments of the invention and certain preferred methods of practicing the same have been illustrated and described herein, it is to be understood that the disclosure is not limited thereto, but may be otherwise variously embodied and practiced within the scope of the following claims.

We claim:

1. A clutch adjuster for a clutch having a housing and a toothed adjusting ring, the clutch adjuster comprising:
   a substantially flat top plate adapted to be secured to the clutch housing;
   a fastener having a head and a shaft, the fastener being captured by an aperture in the substantially flat top plate such that the head of the fastener being arranged above a plane defined by the substantially flat top plate;
   a rotary gear having teeth adapted to mesh with the teeth of the adjusting ring, the rotary gear being securely connected to the shaft of the fastener below the plane defined by the substantially flat top plate;
   a locking member having at least one protrusion, the at least one protrusion passing upward through the aperture of the substantially flat top plate and projecting therefrom and a remainder of the locking member disposed below the substantially flat top plate, the protrusion being configured to be in selective locking engagement with the head of the fastener;
   a resilient member disposed between the locking member and the rotary gear for resiliently biasing the locking member towards the substantially flat top plate.

2. The clutch adjuster as claimed in claim 1, wherein the fastener comprises a bolt.

3. The clutch adjuster as claimed in claim 1, wherein the resilient member is selected from a group consisting of: a coil spring, a disc spring or conical coil spring.

4. The clutch adjuster as claimed in claim 1, wherein the locking member has at least two protrusions.

5. The clutch adjuster as claimed in claim 1, further comprising a locking arrangement for securely locking the shaft of the fastener and the rotary gear.

6. The clutch adjuster as claimed in claim 5, wherein the locking arrangement arrests relative motion between the shaft of the fastener and the rotary gear.

7. The clutch adjuster as claimed in claim 5, wherein the locking arrangement comprises an opening in the shaft, an opening in the rotary gear and a lock pin.

* * * * *